(12) United States Patent
Kerchaert

(10) Patent No.: US 6,665,904 B1
(45) Date of Patent: Dec. 23, 2003

(54) WINDSHIELD WIPER CLIP

(76) Inventor: Robert B. Kerchaert, P.O. Box 609, Linden, MI (US) 48451

( * ) Notice: Subject to any disclaimer, the term of this patent is extended or adjusted under 35 U.S.C. 154(b) by 453 days.

(21) Appl. No.: 09/669,238

(22) Filed: Sep. 25, 2000

(51) Int. Cl.⁷ .............................. B60S 1/28; B60S 1/40; B60S 1/38
(52) U.S. Cl. ............................. 15/250.41; 15/250.361; 15/250.451
(58) Field of Search .................... 15/250.41, 250.4, 15/250.361, 250.44, 250.451, 250.452, 250.453, 250.454

(56) References Cited

U.S. PATENT DOCUMENTS

| | | | |
|---|---|---|---|
| 2,607,944 A | 8/1952 | Turner et al. | |
| 3,874,019 A | * 4/1975 | Speth ...................... | 15/250.32 |
| 4,040,141 A | 8/1977 | O'Steen | |
| 4,138,759 A | 2/1979 | Voorhees | |
| 4,152,905 A | 5/1979 | Lippay | |
| 4,296,522 A | 10/1981 | Brack | |
| 4,343,064 A | 8/1982 | van den Berg et al. | |
| 4,354,293 A | 10/1982 | Le Sausse et al. | |
| 4,388,742 A | 6/1983 | Kimber et al. | |
| 4,553,283 A | 11/1985 | Speth | |
| 4,566,147 A | 1/1986 | Baerenwald et al. | |
| 4,698,874 A | 10/1987 | Fritz, Jr. | |
| 4,813,095 A | * 3/1989 | Sato ........................ | 15/250.24 |
| 4,956,890 A | 9/1990 | Journee | |
| 5,070,573 A | 12/1991 | Journee et al. | |
| 5,145,274 A | 9/1992 | Schon | |
| 5,150,498 A | * 9/1992 | Charng .................. | 15/250.454 |
| 5,168,595 A | 12/1992 | Naylor, Jr. | |
| 5,168,597 A | 12/1992 | Schon et al. | |
| 5,189,752 A | 3/1993 | Longacre et al. | |
| 5,228,167 A | 7/1993 | Yang | |
| 5,233,721 A | 8/1993 | Yang | |
| 5,257,436 A | 11/1993 | Yang | |
| 5,335,393 A | 8/1994 | Charng | |
| 5,384,932 A | 1/1995 | Battlogg | |
| 5,412,834 A | 5/1995 | Burkard et al. | |
| 5,423,105 A | 6/1995 | Scott | |
| 5,497,528 A | * 3/1996 | Wu .......................... | 43/44.99 |
| 5,509,166 A | 4/1996 | Wagner et al. | |
| 5,564,157 A | 10/1996 | Kushida et al. | |
| 5,625,919 A | 5/1997 | Jeffer | |
| 5,746,534 A | 5/1998 | Hara | |
| 5,809,608 A | 9/1998 | Zadro | |
| 5,819,362 A | * 10/1998 | Charng .................. | 15/250.201 |
| 5,885,023 A | 3/1999 | Witek et al. | |
| 5,893,193 A | 4/1999 | Nagy | |
| 5,946,764 A | 9/1999 | Tworzydlo | |
| 6,055,697 A | 5/2000 | Wollenschlaeger | |
| 6,067,687 A | 5/2000 | Shih | |
| 6,272,717 B1 | * 8/2001 | Saraydar .................. | 15/250.32 |

FOREIGN PATENT DOCUMENTS

| | | | | |
|---|---|---|---|---|
| GB | 2234161 A | * | 1/1991 | ............. B60S/1/38 |
| GB | 2239589 A | * | 7/1991 | ............. B60S/1/38 |

* cited by examiner

Primary Examiner—Robert J. Warden, Sr.
Assistant Examiner—S Balsis
(74) Attorney, Agent, or Firm—Brooks Kushman P.C.

(57) ABSTRACT

A windshield wiper assembly for cleaning a windshield and a method for assembling the windshield wipe assembly is disclosed. The windshield wiper assembly includes at least a plurality of wiper blades, a windshield wiper arm, and a locking clip. The plurality of wiper blades contact the windshield and move reciprocatingly across the windshield. The windshield wiper arm is provided for supporting the plurality of wiper blades. The locking clip is attached at a first clip end to the windshield wiper arm and at a second clip end to one of the plurality of wiper blades for positioning the plurality of wiper blades proximate to each other.

10 Claims, 3 Drawing Sheets

WINDSHIELD WIPER CLIP

TECHNICAL FIELD

The present invention relates to windshield wiper systems having windshield wiper arms, wherein the arms include brackets for supporting windshield wiper blades.

BACKGROUND ART

Conventional windshield wiper systems have at least a motor, wiper blade arms (generally two), and wiper blades. Wiper blade arms generally include a main bracket and a plurality of secondary brackets. Typically, the wiper blades are configured to slide into engagement with the secondary brackets. Some wiper blade arms are configured to carry one wiper blade, while other wiper blade arms are configured to carry multiple wiper blades. It is known that prior art windshield wiper systems having a wiper blade which runs the length of the wiper blade arm may at times not contact the windshield, thus reducing the effectiveness of the wiper blade in clearing the windshield. This problem is more pronounced when the windshield has a high degree of curvature.

There does not exist a windshield wiper system which may be configured to carry one or a plurality of wiper blades. More specifically, the prior art windshield wiper systems can not be converted from a one wiper blade windshield wiper system to a multiple wiper blade system to reduce or eliminate the problem described above.

Thus, a need exists for a new and improved windshield wiper system for securing multiple wiper blades to a wiper blade arm. The new and improved windshield wiper system must be compatible with various windshield designs including highly curved windshields.

DISCLOSURE OF INVENTION

Accordingly, an object of the present invention is to provide a locking clip for securing a wiper blade to a wiper blade arm.

In accordance with this and other objects, the present invention provides a windshield wiper system. The windshield wiper system has a wiper blade arm, a plurality of wiper blades, and a locking clip. The wiper blade arm is adjacent a windshield for cleaning the windshield by moving reciprocatingly across the windshield. The wiper blades are slidably secured to the wiper blade arm. Further, the locking clip is provided for holding the wiper blades in close proximity to each other.

In accordance with another aspect of the present invention a wiper blade end bracket is provided for retaining each of the plurality of wiper blades into engagement with the wiper arm.

In accordance with another aspect of the present invention the wiper arm includes a primary bracket and a plurality of secondary brackets.

In accordance with still another aspect of the present invention each of the plurality of wiper blades have blade ends which are slidably secured to the secondary arms and are positioned to overlap at the blade ends.

In accordance with still another aspect of the present invention the locking clip has a blade engagement portion for slidably engaging a blade end of each of the plurality of wiper blades.

In accordance with yet another aspect of the present invention the locking clip has an wiper arm engagement portion for attaching the clip to the wiper arm.

In accordance with yet another aspect of the present invention the locking clip has a first clip portion and a second clip portion.

In accordance with yet another aspect of the present invention the first clip portion includes an aperture for receiving a fastener for securing the first clip portion to the second clip portion.

In accordance with yet another aspect of the present invention the second clip portion further comprises a plurality of apertures for receiving a fastener for securing the second clip portion to the first clip portion, wherein a length of the locking clip may be varied by selecting one of the plurality of apertures and receiving the fastener therein.

In accordance with yet another aspect of the present invention a windshield wiper assembly for cleaning a windshield is provided. The windshield wiper assembly includes a plurality of wiper blades, a windshield wiper arm, and a locking clip. The plurality of wiper blades contact the windshield and move reciprocatingly across the windshield. The windshield wiper arm is provided for supporting the plurality of wiper blades. The locking clip is attached at a first clip end to the windshield wiper arm and at a second clip end to one of the plurality of wiper blades for positioning the plurality of wiper blades proximate to each other.

In accordance with yet another aspect of the present invention a windshield wiper assembly for cleaning a windshield is provided. The windshield wiper assembly has a plurality of wiper blades, a windshield wiper arm, and a locking clip. The plurality of wiper blades contact the windshield and move reciprocatingly across same. Further, the windshield wiper arms are configured to provide support for the plurality of wiper blades. Additionally, the locking clip has a first clip portion and a second clip portion for adjusting a length of the locking clip. The first clip portion is attached to at least one of the plurality of wiper blades and the second clip portion is attached to at least one other of the plurality of wiper blades.

In accordance with yet another aspect of the present invention a method for replacing a single windshield wiper blade with a plurality of wiper blades is provided. The method includes removing a first wiper blade from a wiper blade assembly, attaching a locking clip to a wiper arm of the wiper blade assembly, sliding a second wiper blade onto the wiper arm until an end clip of the first wiper blade engages a prong portion of the locking clip, and sliding a third wiper blade onto the wiper arm until an end clip of the third wiper blade engages a second prong portion of the locking clip.

The above features, benefits and advantages and other features, benefits and advantages of the present invention are readily apparent from the following detailed description of the best mode for carrying out the invention when taken together with the accompanying drawings.

BEST MODE FOR CARRYING OUT THE INVENTION

Figure 1:
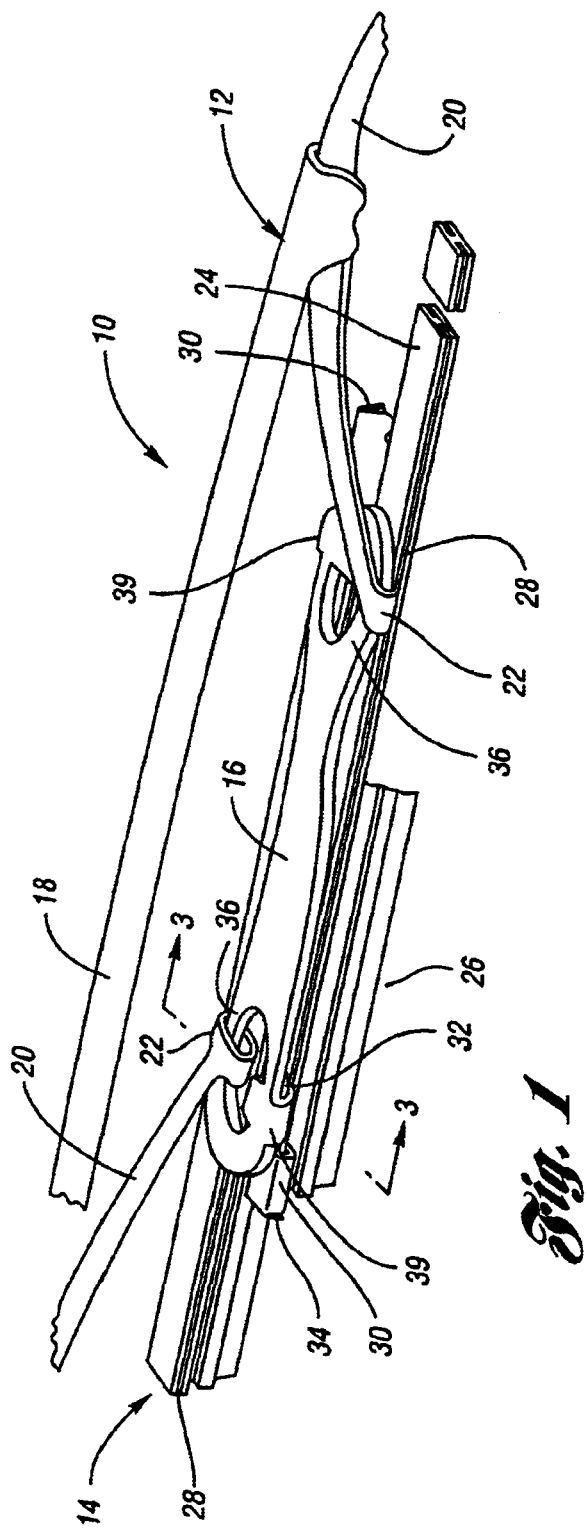
FIG. 1 is a perspective view of a windshield wiper assembly including a wiper arm, wiper blades, and locking clip, in accordance with the present invention.

Referring now to FIG. 1, a windshield wiper assembly 10 is illustrated, in accordance with the present invention. Windshield wiper assembly 10 has a wiper arm 12, wiper blades 14, and a locking clip 16. Wiper arm 12 includes a primary bracket 18 and a plurality of secondary brackets 20.

Each secondary bracket is pivotally attached to the primary bracket 18. Further, each secondary bracket has at each end a pair of bracket prongs 22 which are configured to slidably engage a wiper blade. Wiper blades 14 include a rigid substrate 24 and a resilient wiper member 26. Rigid substrate 24 has a pair of opposed longitudinally extending grooves 28 which slidably engage bracket prongs 22. Typically, rigid substrate 24 is made of an ABS plastic or similar material.

Resilient wiper member 26 is made of a resilient and pliable material which facilitates removing water and debris from the windshield upon reciprocating movement of the wiper blade across the windshield. Additionally, a blade end clip 30 is fixed on rigid substrate 24. Blade end clip 30 has a pair of blade clip prongs 32 at one end that engage the secondary bracket prongs 22 and a turned down flange 34 at the other end that prevents longitudinal movement of the wiper blade, as well known in the art.

In an embodiment of the present invention locking clip 16 is provided for retaining wiper blades 14 in juxtaposition with each other. More specifically, locking clip 16 holds the overlapping ends of the wiper blades 14 in close proximity to each other by engaging the wiper blades and the secondary brackets. Secondary bracket prongs 22 capture a loop portion 36 in locking clip 16 and locking clip prongs 39 capture blade end clip prongs 32 and grooves 28 in wiper substrate 24 to secure the wiper blades to each other and prevent excessive relative longitudinal movement thereof.

Figure 2:
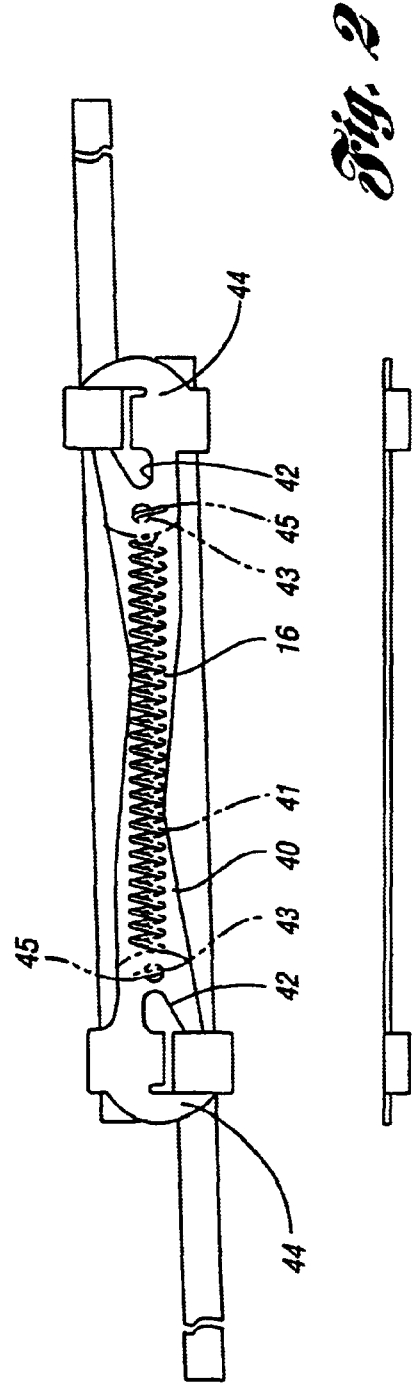
FIG. 2 is a top view of a windshield wiper assembly further illustrating the attachment of the locking clip to the wiper arm and wiper blades, in accordance with the present invention.
Figure 3:
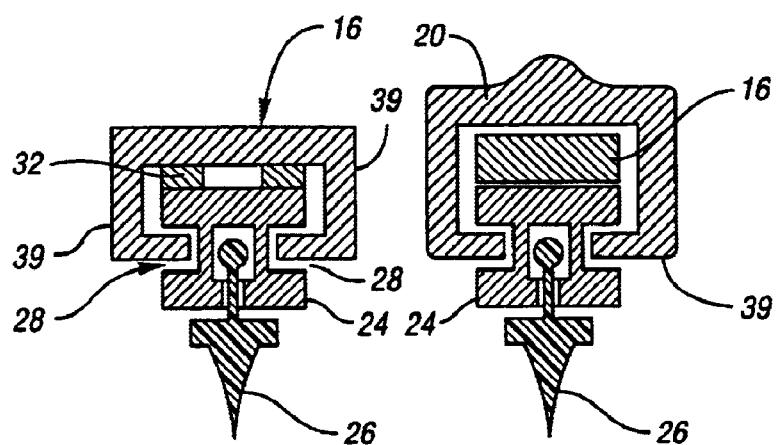
FIG. 3 is a side view of the locking clip and further illustrating the downwardly extending clip prongs, in accordance with the present invention.

With reference to FIGS. 2 and 3, locking clip 16 is shown in further detail. As shown locking clip 16 has a generally flat longitudinal member 40 that includes two apertures 42 at either end. Apertures 42 create clip end loops 44. A cross-sectional view of locking clip 16 is shown in FIG. 3. Locking clip prongs 39 extend downwardly from the locking clip 16 and are formed to grip longitudinal grooves 28 in rigid substrate 24. Further, blade end clip prongs 32 are disposed between the rigid substrate 24 and the locking clip 16 and work to prevent disengagement of the wiper blade 14. More specifically, blade end clip prongs 32 engage locking clip prongs 39. It is essential that the two blade ends are held in concert with each other and normal to the surface of the windshield. The absence of the locking clip of the present invention would allow the blade ends to tip causing metal to glass contact and subsequent damage to the windshield.

In another embodiment of the present invention, longitudinal member 40 is replaced by spring 41. Spring 41 holds the two clip end loops 44 together but allows some longitudinal relative movement thereof. Apertures 43 are formed in each of the clip end loops for receiving respective spring ends 45 of spring 41.

Figure 4:
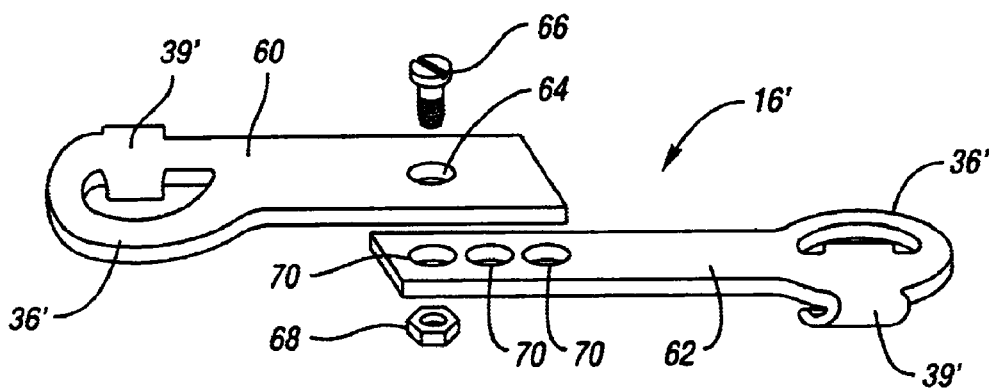
FIG. 4 is a perspective view of an embodiment of the locking clip wherein the locking clip has an adjustable length, in accordance with the present invention.

Referring now to FIG. 4 another embodiment locking clip 16' is shown, in accordance with the present invention. Locking clip 16' is comprised of a first clip portion 60 and a second clip portion 62. First clip portion 60 has a loop portion 36' and clip prongs 39' having similar configurations, as shown and described in the previous embodiment. Additionally, first clip portion 60 has an adjustment aperture 64 for receiving an adjustment screw or bolt 66. Adjustment screw 66 and a fastener nut 68 fixes first clip portion 60 to second clip portion 62. The adjustment screw 66 may be placed for example into three positioning apertures 70 to reduce or increase the length of locking clip 16'. Of course, additional positioning apertures may be provided if desired.

Figure 5:
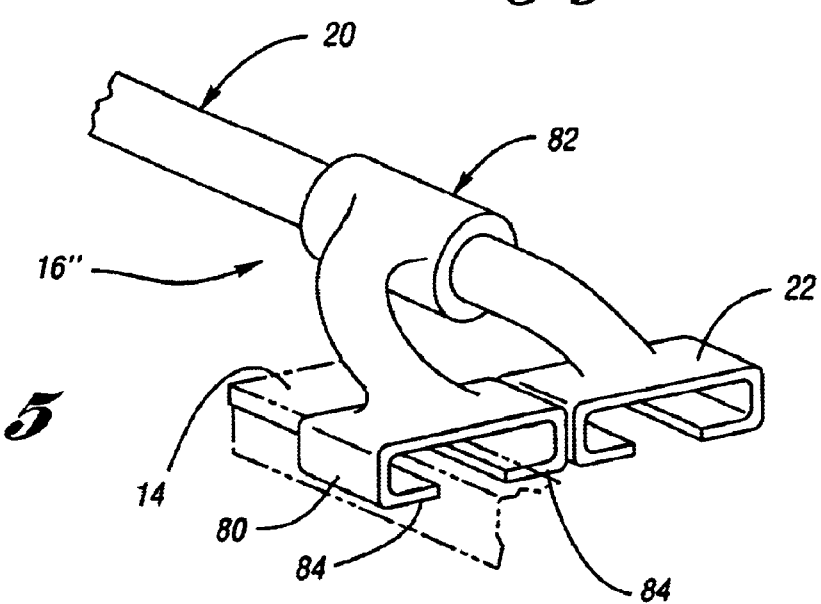
FIG. 5 is a perspective view of yet another embodiment of the locking clip wherein the locking clip attaches to only one secondary bracket of the wiper arm, in accordance with the present invention.

With specific reference to FIG. 5 yet another embodiment is illustrated, in accordance with the present invention. As illustrated, locking clip 16" eliminates the longitudinal member 40 and end loop portions 36 shown and described in the previous embodiments. Locking clip 16" includes a clip prong end 80 and a secondary bracket attachment end 82. Clip prong end 80 includes downwardly extending prongs 84 that are formed to engage and fit within longitudinally extending grooves 28 in wiper blades 14 in a similar manner, as shown and described in the previous embodiments. Secondary bracket attachment end 82 has a C-shaped cross-section which is configured to grasp secondary bracket 20 as shown. Thus, the present embodiment's reduced overall size significantly reduces material costs over the previous embodiments.

Figure 6:
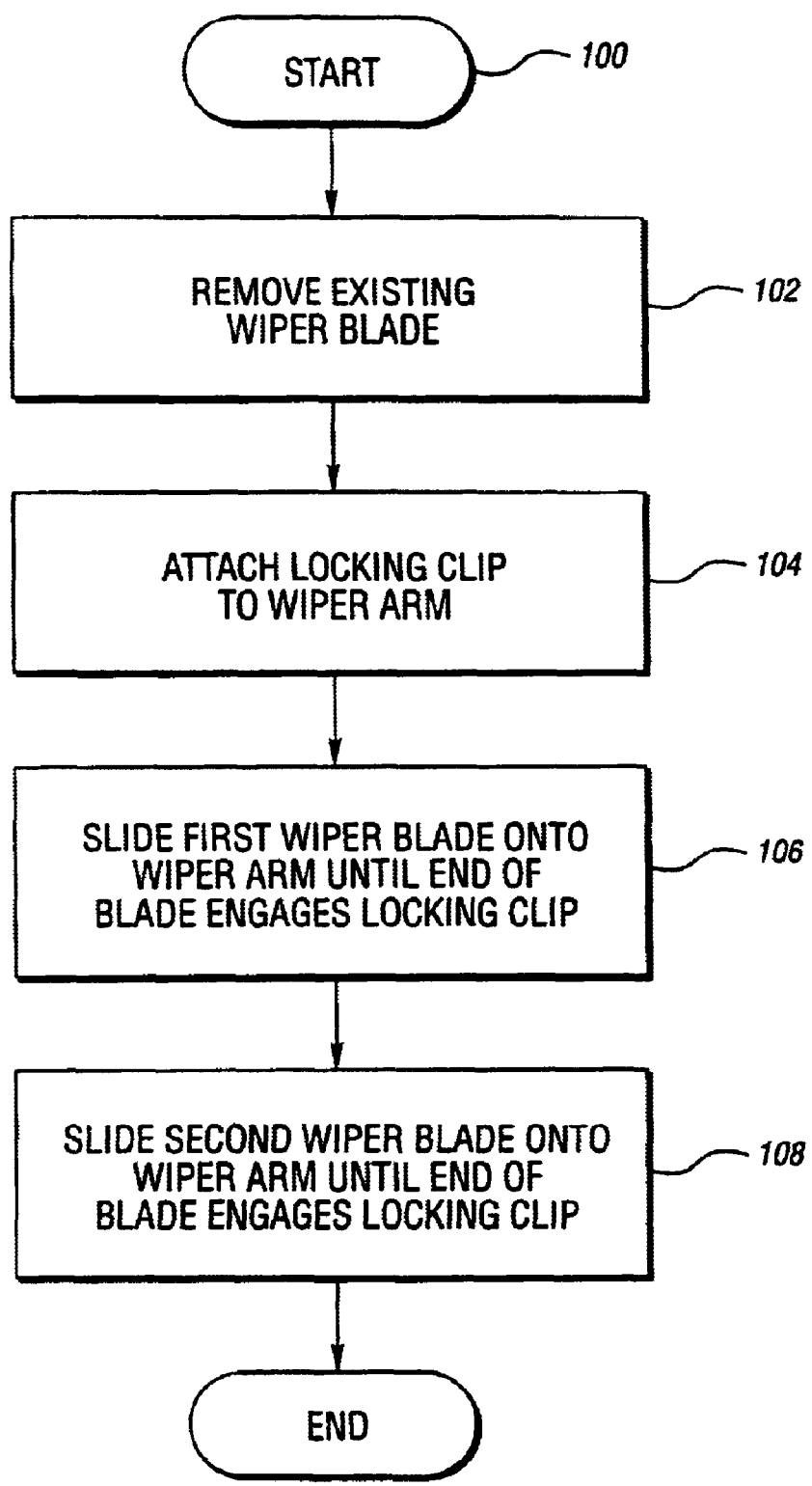
FIG. 6 is a flowchart illustrating a method for using the locking clip, in accordance with the present invention.

Referring now to FIG. 6, a method for assembling the windshield wiper assembly described above is illustrated, in accordance with the present invention. The method is initiated at block 100. As represented by block 102, the existing wiper blade(s) are removed from the wiper arm and discarded. The locking clip 16 is attached to the wiper arm, in a manner as described in the previous embodiments, as represented by block 104. A first wiper blade is slid onto the wiper arm until the end of the blade engages the locking clip 16, as represented by block 106. Finally, a second wiper blade is slid onto the wiper arm until the end of the blade engages the other end of the locking clip 16, as represented by block 108. Of course, additional wiper blades may be used as desired, and the other embodiments of the locking clip may be used to practice the above described method. The method is now complete as represented by block 110.

Accordingly, it is readily apparent from the above disclosure that the present invention offers many advantages and benefits over the prior art. For example, the present invention provides an assembly for creating multiple overlapping wiper blades which may be used with curved windshields to facilitate increased windshield contact. Thus, the present invention allows vehicle designers to select windshields having higher curvatures to create vehicle appearance which were not feasible in the past. Further, due to peculiarities in the market place a consumer may use the instant windshield wiper assembly invention to replace their current windshield wiper assemblies having only one wiper blade at a substantial cost savings. Moreover, the locking clip of the present invention ensures that the wiper blades perform properly and that the wiper blades stay in position as the wiper arm moves across the windshield.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A windshield wiper system comprising:
   a wiper arm adjacent to a windshield for clearing the windshield by moving reciprocatingly across the windshield, the wiper arm having a series of brackets, each adapted to slidably receive a wiper blade;
   a plurality of wiper blades slidably secured to the wiper arm; and
   a locking clip secured to a pair of the series of wiper arm brackets, the locking clip having a pair of brackets, each adapted to receive a wiper blade, for securing the plurality of wiper blades to the wiper arm,
   wherein each of the plurality of wiper blades includes a first end slidably secured to one of the series of wiper arm brackets, and a second end slidably secured to one of the series of locking clip brackets, such that the wiper blades are positioned to partially overlap at the blade ends.

2. The windshield wiper system of claim 1 further comprising a wiper blade end bracket for retaining each of the plurality of wiper blades into engagement with the wiper arm.

3. The windshield wiper system of claim 1, wherein the wiper arm further comprises a primary bracket and a plurality of secondary brackets.

4. The windshield wiper system of claim 1, wherein the locking clip further comprises a first clip portion and a second clip portion.

5. A windshield wiper system comprising:
   a wiper arm oriented adjacent to a windshield for clearing the windshield by moving across the windshield;
   a first bracket and a second bracket, each having a central region mounted to the wiper arm primary bracket, each having a distal end extending outboard relative to the wiper arm and another distal end extending inboard relative to the wiper arm, each distal end being adapted to slidably receive a portion of a wiper blade;
   an elongate locking clip having a first end received within the inboard end of the first bracket, and a second end received within the inboard end of the second bracket;
   a first wiper blade slidably received within both distal ends of the first bracket; and
   a second wiper blade slidably received within both distal ends of the second bracket;
   wherein the engagement of the first wiper blade and the inboard end of the first bracket retains the locking clip first end therebetween, and the engagement of the second wiper blade and the inboard end of the second bracket retains the locking clip second end therebetween, thereby locking the first and second wiper blades relative to each other.

6. The windshield wiper system of claims 5, wherein the locking clip first end is adapted to slidably receive the second wiper blade, and the locking clip second end is adapted to slidably receive the first wiper blade, so that the inboard ends of the first and second wiper blades overlap and for enhancing the locked relationship of the first and second wiper blades.

7. The windshield wiper system of claim 6, wherein the first and second ends of the locking clip each include a pair of spaced apart prongs for engagement within corresponding elongate grooves within the respective second and first wiper blades.

8. The windshield wiper system of claim 6, wherein the first and second ends of the locking clip each include an engagement portion on one lateral side of the locking clip that is sized to be received within the corresponding bracket distal end, and a pair of spaced apart prongs on the other lateral side for engagement within corresponding elongate grooves within the corresponding wiper blade.

9. The windshield wiper system of claim 8, wherein the pairs of prongs are oriented on opposing lateral sides of the locking clip so that the engagement portion of the locking clip first end that is retained by the first wiper blade is aligned with the second pair of prongs that engage the first wiper blade, and the engagement portion of the locking clip second end that is retained by the second wiper blade is aligned with the first pair of prongs that engage the second wiper blade to thereby orient the wiper blades in a generally parallel stacked relationship.

10. A locking clip for converting a windshield wiper system that utilizes one wiper blade per wiper arm into a windshield wiper system that utilizes two wiper blades per wiper arm, the locking clip comprising:
   a longitudinal member having an overall length generally equivalent to a longitudinal spacing between a first pair and a sequential second pair of prongs that extend from a wiper arm for receiving a wiper blade;
   a first engagement portion and a second engagement portion formed on opposed distal ends of the longitudinal member, each engagement portion being sized to be received within the corresponding pair of wiper arm prongs; and
   a first pair of prongs and a second pair of prongs for receiving a wiper blade, extending from opposed distal ends of the longitudinal member, laterally adjacent to the respective engagement portions;
   wherein a first wiper blade is received within the first pair of wiper arm prongs, retaining the corresponding engagement portion therebetween, and the first wiper blade is received within the second pair of locking clip prongs, a second wiper blade is received within the second pair of wiper arm prongs, retaining the corresponding engagement portion therebetween, and the second wiper blade is received within the first pair of locking clip prongs, thereby locking the first and second wiper blades relative to each other.

* * * * *